(12) United States Patent
Manson et al.

(10) Patent No.: US 10,794,496 B2
(45) Date of Patent: Oct. 6, 2020

(54) BALL VALVE SYSTEM

(71) Applicant: Cameron International Corporation, Houston, TX (US)

(72) Inventors: Ronald J. Manson, Spring, TX (US); Mircea Balan, Moore, OK (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 359 days.

(21) Appl. No.: 15/231,945

(22) Filed: Aug. 9, 2016

(65) Prior Publication Data

US 2018/0045324 A1 Feb. 15, 2018

(51) Int. Cl.
*F16K 5/20* (2006.01)
*F16K 39/06* (2006.01)
*F16K 5/06* (2006.01)

(52) U.S. Cl.
CPC ............ *F16K 5/205* (2013.01); *F16K 5/0689* (2013.01); *F16K 5/201* (2013.01); *F16K 39/06* (2013.01)

(58) Field of Classification Search
CPC . F16K 5/20; F16K 5/201; F16K 5/205; F16K 5/06; F16K 5/0678; F16K 5/0673; F16K 5/0689; F16K 39/06
USPC ........ 251/159, 170, 172, 174, 175, 176, 185
See application file for complete search history.

(56) References Cited

U.S. PATENT DOCUMENTS

| | | | |
|---|---|---|---|
| 3,378,026 A * | 4/1968 | Oliver | F16K 5/0673 |
| | | | 137/246.22 |
| 3,379,410 A * | 4/1968 | Stewart, Jr. | F16K 5/0673 |
| | | | 137/119.08 |
| 3,416,558 A * | 12/1968 | Works | F16K 5/0673 |
| | | | 137/246.22 |
| 3,463,448 A | 8/1969 | Piccardo | |
| 3,656,498 A * | 4/1972 | Grove | F16K 5/0673 |
| | | | 137/246.22 |

(Continued)

FOREIGN PATENT DOCUMENTS

| | | |
|---|---|---|
| CN | 104791512 A | 7/2015 |
| FR | 2981720 A1 | 4/2013 |

(Continued)

OTHER PUBLICATIONS

PCT International Search Report & Written Opinion for PCT Application No. PCT/US2017/046171 dated Nov. 10, 2017; 16 pgs.

(Continued)

*Primary Examiner* — David Colon-Morales
(74) *Attorney, Agent, or Firm* — Fletcher Yoder PC (57) ABSTRACT

A ball valve positioned between a first line and a second line includes a housing and a ball disposed a ball disposed within the housing. The ball includes a bore and is configured to rotate between an open position and a closed position. The ball valve also includes an annular seat disposed between the housing and the ball. The annular seat includes a first annular sealing ring extending circumferentially about a radially-outer surface of the annular seat and an axially-extending passageway extending through the annular seat to enable fluid flow from a valve cavity to an annular space between the annular seat and the housing. The first annular sealing ring, the axially-extending passageway, and the annular space facilitate movement of the annular seat away from the ball as the ball rotates from the closed position toward the open position.

20 Claims, 5 Drawing Sheets

(56) References Cited

U.S. PATENT DOCUMENTS

| | | | | |
|---|---|---|---|---|
| 3,667,727 A * | 6/1972 | Bowden | F16K 3/0227 | 251/172 |
| 3,695,579 A * | 10/1972 | Allen | F16K 5/0673 | 137/330 |
| 3,749,357 A * | 7/1973 | Fowler | F16K 3/207 | 251/172 |
| 3,752,178 A * | 8/1973 | Grove | F16K 5/0673 | 137/246.22 |
| 3,760,833 A * | 9/1973 | Kemp | F16K 5/0673 | 137/246.22 |
| 3,784,155 A * | 1/1974 | Tomlin | F16K 5/0673 | 251/181 |
| 3,856,261 A * | 12/1974 | Jourdan | F16K 5/205 | 137/112 |
| 4,083,376 A * | 4/1978 | Alaniz | F16K 5/0673 | 137/246.22 |
| 4,084,608 A * | 4/1978 | Laignel | F16K 5/0673 | 137/246.22 |
| 4,108,196 A * | 8/1978 | Calvert | F16K 5/0673 | 137/72 |
| 4,135,545 A * | 1/1979 | Fowler | F16K 5/0673 | 137/246.22 |
| 4,254,793 A * | 3/1981 | Scaramucci | F16K 5/0673 | 137/246.22 |
| 4,280,522 A * | 7/1981 | Pechnyo | F16K 5/0673 | 137/72 |
| 4,286,614 A * | 9/1981 | Kacal | F16K 5/0673 | 137/246.22 |
| 4,292,989 A * | 10/1981 | Cazzaniga | F16K 5/0673 | 137/72 |
| 4,477,055 A * | 10/1984 | Partridge | F16K 5/0673 | 137/328 |
| 4,747,578 A * | 5/1988 | Kivipelto | F16K 5/207 | 251/159 |
| 5,533,738 A * | 7/1996 | Hoffmann | F16K 5/205 | 251/172 |
| 6,082,707 A * | 7/2000 | Hosie | F16K 5/205 | 251/172 |
| 7,275,564 B2 * | 10/2007 | Bazin | F16K 5/201 | 137/625.47 |
| 8,496,226 B2 * | 7/2013 | Dalluge | F16K 5/0636 | 251/159 |
| 9,328,828 B1 * | 5/2016 | Scaramucci | F16K 5/20 | |
| 2006/0065314 A1 | 3/2006 | Bazin et al. | | |
| 2011/0147635 A1 * | 6/2011 | Seveso | F16K 5/0678 | 251/315.08 |
| 2012/0167987 A1 * | 7/2012 | Balan | F16J 15/3452 | 137/1 |
| 2012/0168660 A1 * | 7/2012 | Balan | F16K 5/0678 | 251/314 |
| 2012/0211690 A1 * | 8/2012 | Anderson | F16K 5/0678 | 251/315.1 |
| 2014/0203203 A1 * | 7/2014 | Scattini | F16K 5/0663 | 251/317 |
| 2017/0175908 A1 * | 6/2017 | Chen | F16K 3/0236 | |

FOREIGN PATENT DOCUMENTS

| | | |
|---|---|---|
| WO | 2015086876 A1 | 6/2015 |
| WO | 2016029689 A1 | 3/2016 |

OTHER PUBLICATIONS

Office Action issued in CN application 2017800548107, dated Feb. 26, 2020 (15 pages).

* cited by examiner

BALL VALVE SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves are employed to open or close to enable or block a flow of fluid in a variety of applications. Typical ball valves may include a body, an adapter, a rotatable ball disposed within the body and the adapter, and a stem coupled to the ball. Trunnion ball valves use seats that physically contact the ball of the ball valve. However, as the ball rotates within the ball valve from a closed position to an open position, the fluid under pressure drives the seat into the ball, thereby increasing torque needed to move the ball to the open position and/or causing wear on contacting surfaces of the ball and/or the seat, for example.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure include a ball valve having an adjustable seat. In particular, the seat of the ball valve disclosed herein is configured to automatically move in response to changes in a pressure across the seat. For example, the seat is configured to automatically move away from the ball upon an increase (e.g., a substantial and/or a sudden increase) in pressure within a cavity of the ball valve (e.g., upon rotating the ball from a fully closed position toward an open position). The seat may then automatically return to its original position and/or move back toward the ball as the pressure balances across the seat. Thus, the disclosed seat may be configured to mechanically self-adjust to temporarily provide a gap between the seat and the ball of the ball valve without the use of external fluid sources, complex electronic controllers, motors, and/or actuators, although in certain embodiments external fluid sources, complex electronic controllers, motors, and/or actuators, or the like may be utilized to supplement the techniques disclosed herein. The ball valve may be utilized as part of any suitable fluid-handling system, such as an energy-acquisition or processing system (e.g., a hydrocarbon-production or processing system, such as a subsea or surface oil or gas well, a pipeline, a natural-gas processing terminal, a refinery, or a natural-gas powered electrical plant, or the like).

Figure 1:
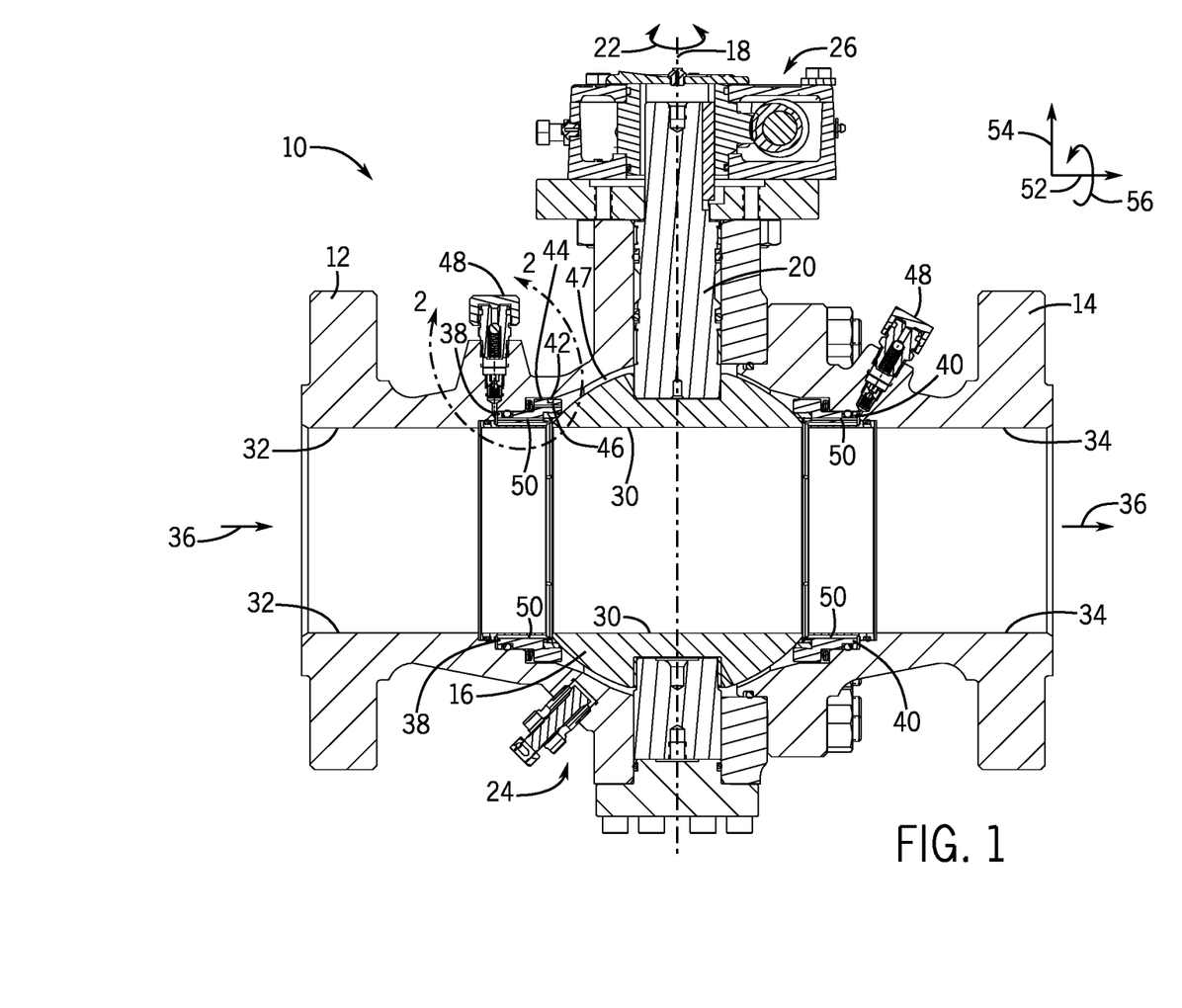
FIG. 1 is a cross-sectional side view of a ball valve, in accordance with an embodiment of the present disclosure.

Turning now to the figures, FIG. 1 is a cross-sectional side view of a ball valve 10, in accordance with an embodiment. The ball valve 10 includes a housing, which may be formed by an annular body 12 and an annular adapter 14. In the illustrated embodiment, the body 12 and the adapter 14 of the ball valve 10 are configured to mate with each other such that a seal is created between the body 12 and the adapter 14. The ball valve 10 may be constructed with two adapters. The ball valve 10 includes a ball 16 configured to rotate between the illustrated open position 24 and a closed position about a rotational axis 18, as shown by arrow 22. As shown, the ball 16 is coupled to a stem 20 such that rotation of the stem 20 (e.g., via a hydraulic or pneumatic or electronic actuator or via a handle that may be operated manually) causes the ball 16 to rotate.

In the open position 24, the ball valve 10 enables fluid flow through the ball valve 10. As shown, in the open position 24, a bore 30 of the ball 16 is aligned with a bore 32 of the body 12 and a bore 34 of the adapter 14, such that fluid may pass through the ball valve 10. In general, a fluid 36 may enter through either the body 12 or the adapter 14 and exit through the other. For example, in the illustrated embodiment, the fluid 36 enters the bore 32 of the body 12 from a first line or passageway, flows through the bore 30 of the ball 16, and exits the bore 34 of the adapter 14 into a second line or passageway. In the closed position, the bore 30 of the ball 16 is rotated perpendicular to the bores 32, 34 of the body 12 and the adapter 14, thereby substantially blocking the flow of the fluid 36 through the ball valve 10. As discussed in more detail below, in the closed position, a cavity pressure within a cavity 47 of the ball valve 10 may be less than a line pressure in the bore 32 of the body 12.

As illustrated in FIG. 1, the ball valve 10 also includes two annular seats, a first seat 38 (e.g., a first annular seat or an upstream annular seat) positioned between the ball 16 and the body 12, and a second seat 40 (e.g., a second annular seat or a downstream annular seat) positioned between the ball 16 and the adapter 14. During operation of the ball valve 10, the seats 38, 40 create respective seals between the ball 16 and the body 12 and between the ball 16 and the adapter 14. The first seat 38 may include a seal 42 (e.g., annular seal) along a first radially-outer surface 44 (e.g., radially-outermost surface) of the first seat 38 and/or one or more passageways 46 (e.g., axially-extending passageways).

As discussed in more detail below, the seal 42 and/or the passageways 46 may enable the first seat 38 to automatically, temporarily move away from the ball 16 upon an increase (e.g., a substantial increase, such as more than or approximately 10, 20, 30, 40, 50 percent increase compared to a baseline pressure within the cavity 47 while the ball valve 10 is moved from the closed position, and/or a sudden increase, such as more than or approximately 10, 20, 30, 40, 50 percent increase compared to the baseline pressure within the cavity 47 over a period of time, such as less than or approximately 5, 10, 20, or 30 seconds) in pressure within the cavity 47 of the ball valve 10 as the ball 16 rotates from the closed position toward the open position 24. The first seat 38 may automatically return to its original position and/or move toward the ball 16 as the pressure balances across the first seat 38 after a period of time and/or during further rotation of the ball 16 toward the open position 24. Thus, the first seat 38 may be configured to self-adjust to temporarily provide a gap between the first seat 38 and the ball 16 of the ball valve 10, thereby reducing the torque needed to rotate the ball 16 over at least part of the stroke from the closed position toward the open position 24 and/or reducing wear on contacting surfaces of the ball 16 and/or the first seat 38, for example. In certain embodiments, the first seat 38 may move automatically without the use of external fluid sources (i.e., driven only by pressure changes caused by the movement of the fluid 36 within the ball valve 10, such as within the cavity 47 and the bores 30, 32, 34), complex electronic controllers, motors, and/or actuators, although in certain embodiments external fluid sources, complex electronic controllers, motors, and/or actuators, or the like may be utilized to supplement the techniques disclosed herein.

In certain embodiments, the ball valve 10 includes injection ports 48 that are configured to align with and enable fluid communication with injection channels 50 in the seats 38, 40. The injection ports 48 and injection channels 50 facilitate the delivery of lubricating or sealant fluids to the interfaces between the seats 38, 40 and the ball 16. The lubricating fluids reduce the frictional forces generated between the ball 16 and the seats 38, 40 when the ball 16 is rotated between the open position 24 and the closed position. To facilitate discussion, the ball valve 10 and its components may be described with reference to an axial axis or direction 52, a radial axis or direction 54, and a circumferential axis or direction 56.

Figure 2:
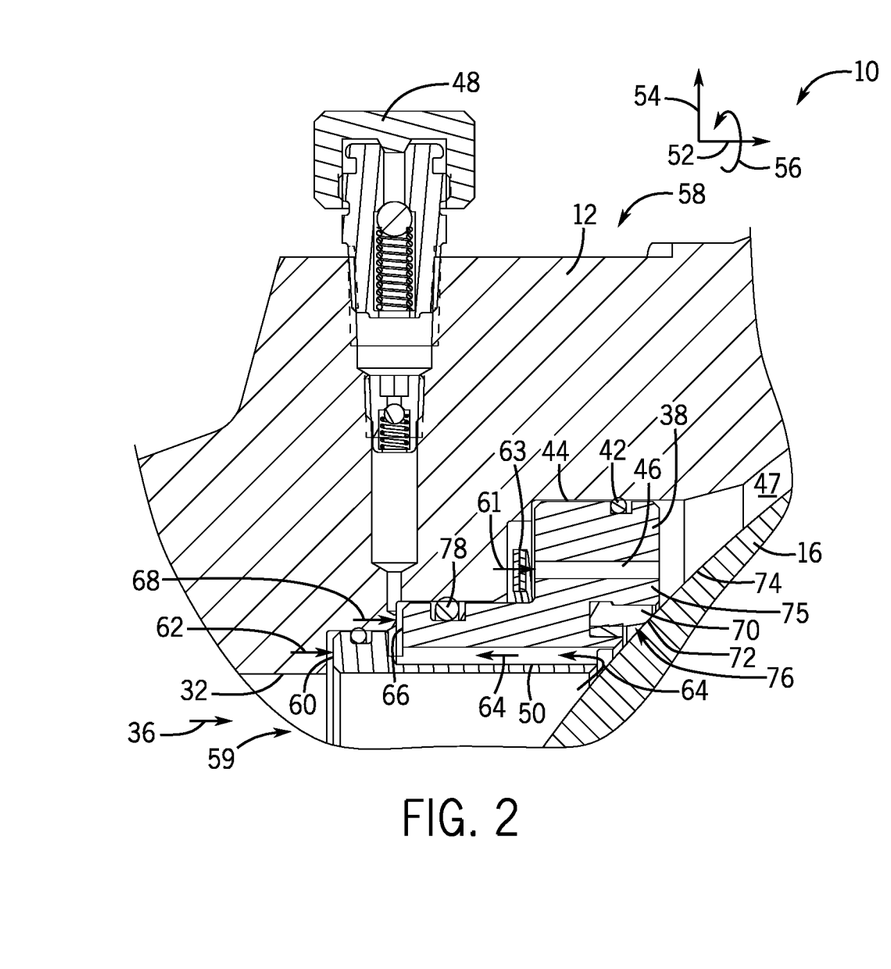
FIG. 2 is a cross-sectional side view of a portion of the ball valve of FIG. 1 taken within line 2-2, wherein the ball valve is in a closed position.

FIG. 2 is a cross-sectional side view of a portion of the ball valve 10 of FIG. 1 taken within line 2-2. In the illustrated embodiment, the ball valve 10 is in a closed position 58 (e.g., fully closed position). In the closed position 58, the bore 30 of the ball 16 is rotated perpendicular to the bores 32, 34 of the body 12 and the adapter 14, thereby substantially blocking the flow of the fluid 36 through the ball valve 10. Furthermore, when the ball valve 10 is in the closed position 58, a contacting surface 72 (e.g., sealing face) of the first seat 38 contacts an outer surface 74 of the ball 16 and forms a seal 76 with the ball 16. In certain embodiments, the contacting surface 72 is part of an insert 70 (e.g., annular insert or annular seal) coupled to a body 75 of the first seat 38.

When the ball valve 10 is in the closed position 58, the seal 76 and a main seal 78 (e.g., annular seal) substantially block a flow of the fluid 36 across the first seat 38. In certain circumstances, after the ball valve 10 reaches the closed position 58, the cavity pressure within the cavity 47 of the ball valve 10 is relieved or reduced (e.g., via a decrease in the pipeline downstream pressure or a valve or other pressure relief system). Accordingly, a pressure on a first side 59 (e.g., upstream side or in the bore 32 of the body 12) of the first seat 38 is higher than a pressure on a second side (e.g., downstream side or within the cavity 47 of the ball valve 10) of the first seat 38, which causes the first seat 38 to maintain contact with the ball 16. For example, in certain embodiments, the fluid 36 exerts a force 62 on an axially-facing surface 60 (e.g., annular surface) of the first seat 38 and/or the fluid 36 travels through the injection channels 50, as shown by arrows 64, to exert a force 68 on an axially-facing surface 66 (e.g., annular surface) of the first seat 38 to drive the first seat 38 toward the ball 16. Additionally or alternatively, a spring force 61 exerted on the first seat 38, such as by a biasing member 63 (e.g., spring) positioned between opposed axially-facing surfaces of the body 12 and the first seat 38, may drive the first seat 38 toward the ball 16.

In certain circumstances, a large differential pressure (e.g., more than 30, 50, 70, or 100 megapascals (MPa) and/or more than 10, 20, 30, 40, or 50 percent) may exist across the ball valve 10 when the ball valve 10 is in the closed position 58. Without the disclosed embodiments, while rotating the ball valve 10 from the closed position 58 toward the open position 24 (e.g., from the fully closed position 58 to approximately 20 to 25 degrees open), flow of the fluid 36 through the ball valve 10 may cause a high localized force at the interface between the first seat 38 and the ball 16 and/or cause the first seat 38 to be pushed into a slightly cocked or tilted position within the bore 30 of the ball 16, thereby damaging these components and/or increasing torque requirements for opening the ball valve 10. As discussed in more detail below, the disclosed embodiments advantageously provide features, such as the seal 42 in the radially-outer face 44 of the first seat 38 and/or the passageways 46, that cause the first seat 38 to automatically move away from the ball 16 as the ball valve 10 moves from the closed position 58 toward the open position 24.

Figure 3:
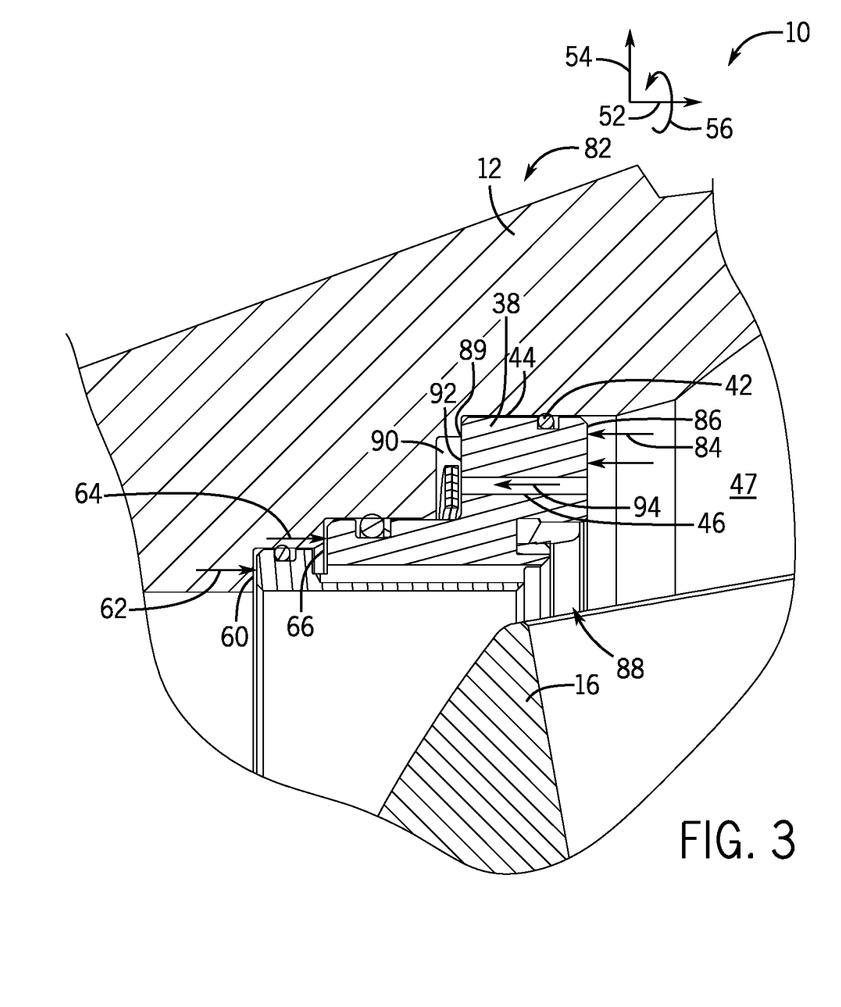
FIG. 3 is a cross-sectional top view of another portion of the ball valve proximate to the portion of FIG. 2, wherein the ball valve is between the closed position and an open position.

FIG. 3 is a cross-sectional top view of another portion of the ball valve 10 proximate to the portion of FIG. 2. As the ball valve 10 moves from the closed position 58 toward the open position 24 (e.g., to the illustrated intermediate position 82, which may be less than or equal to approximately 5, 10, 15, 20, 25, 30, 40, 50, or 60 degrees from the closed position 58, or between about 5 to 40, 10 to 25, or 15 to 20 degrees from the closed position 58), the cavity pressure within the cavity 47 of the ball valve 10 increases. The seal 42 is an annular seal that extends circumferentially along the radially-outer face 44 of the first seat 38. The seal 42 is configured to block fluid flow along the radially-outer face 44 of the first seat 38, thereby causing the cavity pressure to exert a force 84 on an axially-facing surface 86 of the first seat 38 that drives the first seat 38 away from the ball 16. Thus, in the disclosed embodiments, the first seat 38 may be physically separated from (e.g., may not contact) the ball 16 by a gap 88 (e.g., annular gap) as the ball 16 rotates through a portion of its path between the closed position 58 and the open position 24. In some embodiments, the first seat 38 and the ball 16 may be physically separated from one another for more than or approximately 0.5, 1, 5, 10, 30, or 60 seconds. In some embodiments, the first seat 38 and the ball 16 may be physically separated from one another through at least about 5, 10, 15, 20, 25, 30, or 40 degrees of the stroke between the closed position 58 to the open position 24.

Additionally or alternatively, the first seat 38 and the ball 16 may be physically separated from one another until the ball 16 is rotated to more than or approximately 5, 10, 15, 20, 25, or 30 degrees from the closed position 58. Such a configuration may desirably reduce torque needed to rotate the ball 16 and/or reduce wear on the contacting surfaces of the first seat 38 and the ball 16, for example.

As shown, the body 12 includes a shoulder 89 (e.g., an annular axially-facing surface) that is configured to block and/or to limit axial movement of the first seat 38 relative to the body 12, which in turn may protect the spring 63. In the illustrated embodiment, the force 84 exerted by the cavity pressure in the cavity 47 acts on a first surface area (e.g., the surface area of the axially-facing surface 86) that is substantially larger (e.g., more than or equal to approximately 10, 15, 20, 25, 30, 35, 40, 45, or 50 percent larger) than a second surface area (e.g., the surface area of the axially-facing surfaces 60, 66) on which the forces 62, 68 exerted by the line pressure act. In some such embodiments, upon rotating the ball 16 to the intermediate position 82 from the closed position 58, the cavity pressure in the cavity 47 may nearly immediately drive the first seat 38 away from the ball 16.

In the illustrated embodiment, the first seat 38 includes the passageways 46. In certain embodiments, one or more passageways 46 extend through the body 75 of the first seat 38 and are positioned between the seal 42 and the main seal 78 along the radial axis 54. The one or more passageways 46, which extend along the axial axis 52, may be positioned at discrete locations circumferentially about the first seat 38. The one or more passageways 46 may have any suitable configuration that enables fluid to flow from the cavity 47 to a space 90 (e.g., annular space) on an opposite side of the first seat 38 from the cavity 47. In the illustrated embodiment, the space 90 is defined between the body 12 and an axially-facing surface 92 of the first seat 38. Such a configuration enables pressure to increase in the space 90 over time, thereby eventually causing pressure balance across the first seat 38 and enabling the first seat 38 to move back toward the ball 16. The passageways 46 may have any suitable diameter, geometry, spacing, and/or number to adjust a timing and/or a speed of movement of the first seat 38. For example, relatively smaller passageways 46 may cause the first seat 46 to remain separated from the ball 16 for a longer period of time than relatively larger passageways 46. Accordingly, the first seat 38 may be automatically, temporarily separated from the ball 16 as the ball 16 is rotated from the closed position 58 toward the open position 24, and returns to contact the ball 16 once the pressure balances across the first seat 38.

Figure 4:
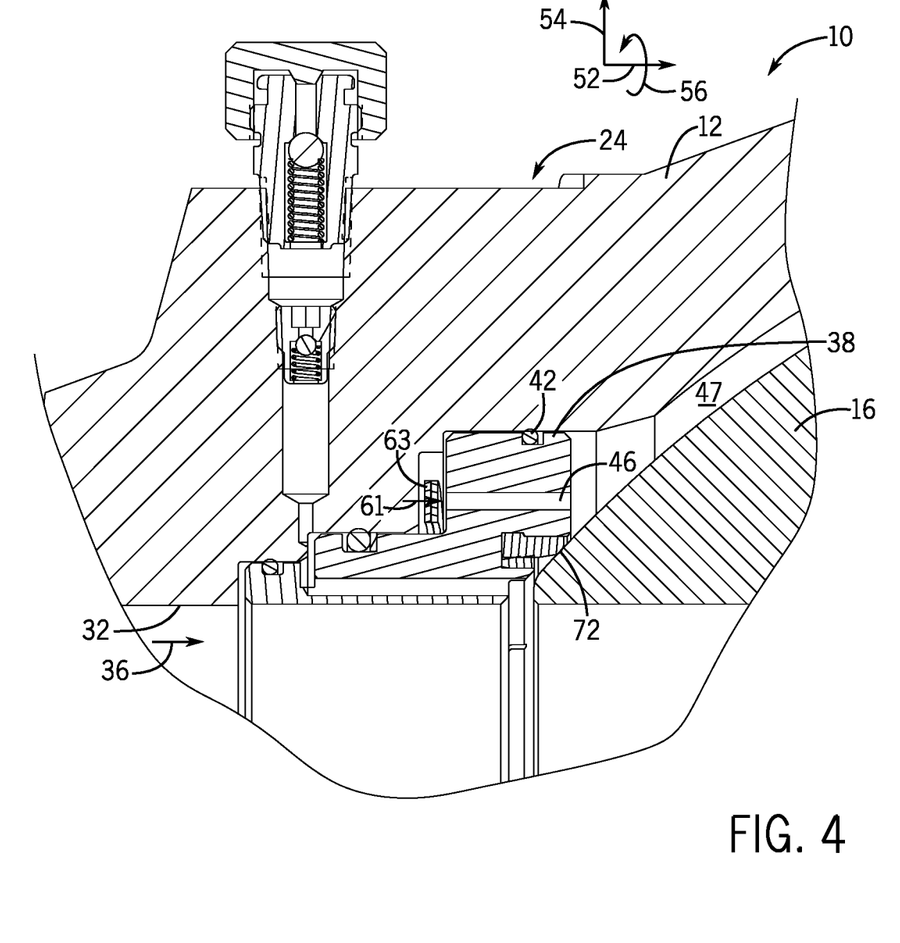
FIG. 4 is a cross-sectional side view of the portion of the ball valve of FIG. 2, wherein the ball valve is in the open position.

FIG. 4 is a cross-sectional side view of the portion of the ball valve 10 of FIG. 2. In the illustrated embodiment, the ball valve 10 is in the open position 24. In the open position 24, the pressures and forces across the first seat 38, including the spring force 61, drive the first seat 38 toward the ball 16 such that the contacting surface 72 of the first seat 38 contacts and forms the seal 76 with the ball 16.

Figure 5:
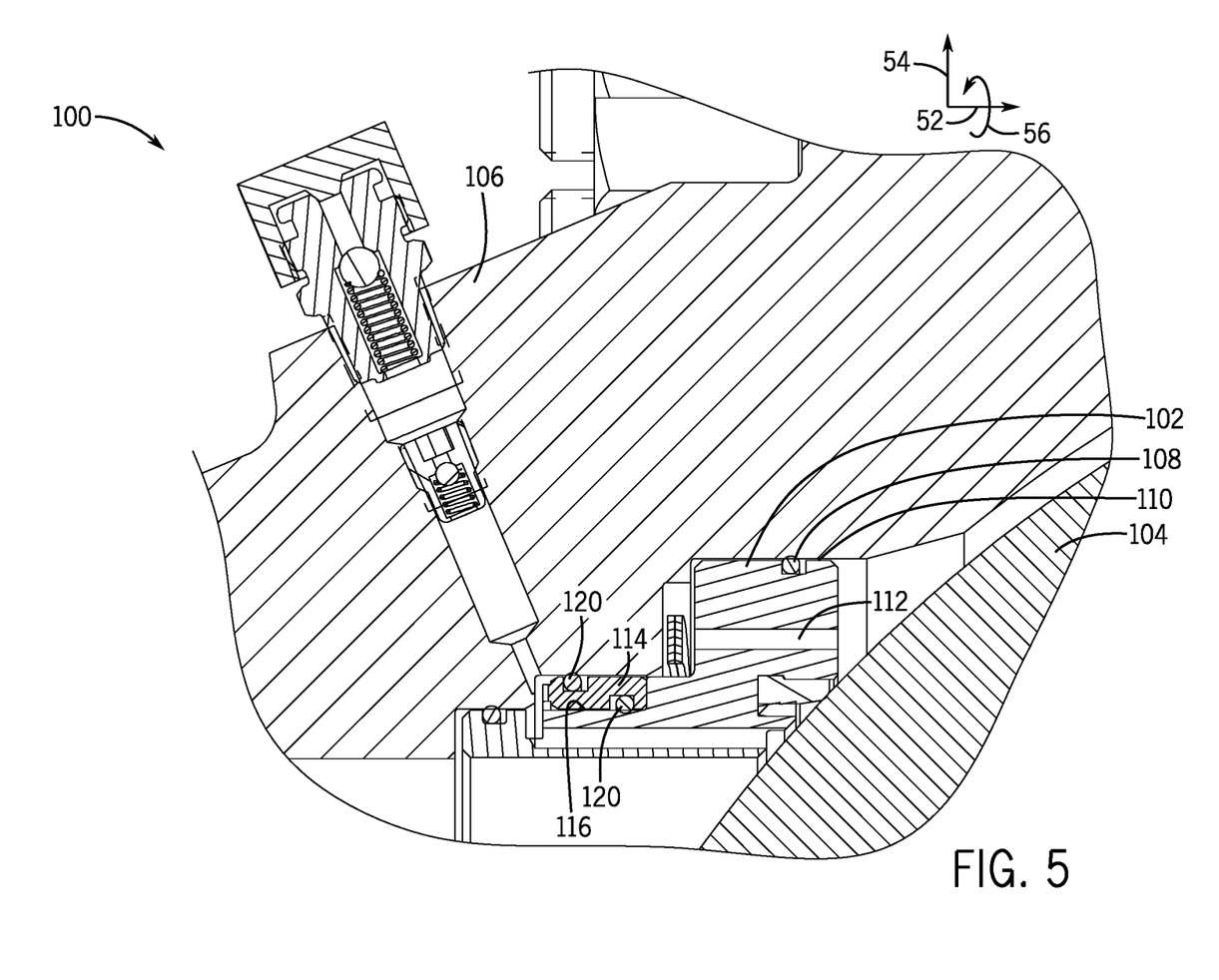
FIG. 5 is a cross-sectional side view of a ball valve, in accordance with another embodiment of the present disclosure.

It should be understood that the features disclosed above with respect to FIGS. 1-4 may be adapted for use with other types of ball valves or annular seats of various constructions. For example, FIG. 5 is a cross-sectional side view of a portion of a ball valve 100 having an annular seat 102 (e.g., a double-piston annular seat). In the illustrated embodiment, the ball valve 100 includes a ball 104 and the annular seat 102, which is positioned between the ball 104 and a body 106. The annular seat 102 may include a seal 108 (e.g., annular seal) along a first radially-outer surface 110 (e.g., radially-outermost surface) of the annular seat 102 and/or one or more passageways 112 (e.g., axially-extending passageways). In the illustrated embodiment, a cartridge 114 (e.g., annular cartridge) is positioned along a radially-outer surface 116 of the annular seat 102 and may support one or more sealing rings 120. Thus, the annular seat 102 may be configured to automatically, temporarily move away from the ball 104 as the ball 104 rotates between the closed position and the open position, as discussed above with respect to FIGS. 1-4.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ball valve positioned between a first line and a second line, comprising:
 a housing;
 a ball disposed within the housing and having a bore, wherein the ball is configured to rotate between an open position and a closed position;
 an annular seat disposed between the housing and the ball, wherein the annular seat comprises:
  one or more first axially-facing surfaces exposed to a valve cavity pressure within a valve cavity;
  one or more second axially-facing surfaces exposed to a first line pressure within the first line;
  a first annular sealing ring extending circumferentially about a radially-outer surface of the annular seat; and
  an axially-extending passageway extending through the annular seat to enable fluid flow from the valve cavity to an annular space between the annular seat and the housing, wherein a first surface area of the one or more first axially-facing surfaces is at least 10 percent greater than a second surface area of the one or more second axially-facing surfaces, and wherein the first surface area, the second surface area, and the first annular sealing ring, the axially-extending passageway, and the annular space facilitate temporary movement of the annular seat away from the ball to provide a gap separating the annular seat and the ball as the ball rotates from the closed position toward the open position; and
 an annular cartridge disposed between the annular seat and the housing, wherein the annular cartridge supports an inner sealing ring disposed against the annular seat and an outer sealing ring disposed against the housing.

2. The ball valve of claim 1, wherein the first annular sealing ring is configured to form an annular seal between the radially-outer surface of the annular seat and the housing and to block fluid flow from the valve cavity to the annular space.

3. The ball valve of claim 1, wherein the first annular sealing ring extends circumferentially about a radially-outermost portion of the radially-outer surface of the annular seat.

4. The ball valve of claim 3, wherein the annular cartridge extends circumferentially about the radially-outer surface of the annular seat, wherein the annular cartridge is configured to block the flow of working fluid from the first line to the annular space between the annular seat and the housing.

5. The ball valve of claim 4, wherein the axially-extending passageway is positioned between the first annular sealing ring and the annular cartridge along a radial axis of the ball valve.

6. The ball valve of claim 1, comprising one or more additional axially-extending passageways extending from the valve cavity to the annular space and positioned at discrete circumferential locations about the annular seat, and wherein the axially-extending passageway and the one or more additional axially-extending passageways facilitate movement of the annular seat toward the ball after the temporary movement of the annular seat away from the ball as the ball rotates from the closed position toward the open position.

7. The ball valve of claim 1, comprising a biasing member positioned in the annular space, wherein the biasing member is configured to bias the annular seat toward the ball.

8. The ball valve of claim 7, comprising a shoulder extending from the housing and configured to limit the movement of the annular seat, thereby protecting the biasing member.

9. The ball valve of claim 1, wherein the first surface area, the second surface area, the first annular sealing ring, the axially-extending passageway, and the annular space facilitate temporary movement of the annular seat away from the ball while the ball moves through at least a portion of a path between approximately 5 and 40 degrees from the closed position.

10. The ball valve of claim 1, wherein the first surface area is at least 25 percent greater than the second surface area.

11. A ball valve positioned between a first line and a second line, comprising:
 a housing;
 a ball disposed within the housing and having a bore, wherein the ball is configured to rotate about a rotational axis between an open position to enable a flow of working fluid through the first line and the second line and a closed position to block the flow of working fluid through the first line and the second line;
 an annular seat disposed between the housing and the ball;
 an annular space defined between the annular seat and the housing;
 wherein the annular seat comprises:
  one or more first axially-facing surfaces exposed to a valve cavity pressure within a valve cavity; and
  one or more second axially-facing surfaces exposed to a first line pressure within the first line;
 a plurality of seals configured to isolate the annular space from the first line and from the valve cavity; and
 an axially-extending passageway extending through the annular seat to enable fluid flow from the valve cavity to the annular space;
 wherein a first surface area of the one or more first axially-facing surfaces is at least 10 percent greater than a second surface area of the one or more second axially-facing surfaces, and wherein the first surface area, the second surface area, the plurality of seals, the axially-extending passageway, and the annular space facilitate temporary movement of the annular seat away from the ball to provide a gap separating the annular seat and the ball as the ball rotates from the closed position toward the open position; and
 an annular cartridge disposed between the annular seat and the housing, wherein the annular cartridge supports an inner sealing ring of the plurality of seals disposed against the annular seat and an outer sealing ring of the plurality of seals disposed against the housing.

12. The ball valve of claim 11, wherein the plurality of seals comprises a first annular sealing ring extending circumferentially about a radially-outermost portion of a radially-outer surface of the annular seat, and the first annular sealing ring is configured to contact the housing and to block fluid flow from the valve cavity to the annular space.

13. The ball valve of claim 11, wherein the axially-extending passageway is positioned between a first annular sealing ring of the plurality of seals and the annular cartridge having the inner and outer sealing rings of the plurality of seals along a radial axis of the ball valve.

14. A ball valve positioned between a first line and a second line, comprising:
 a housing;
 a ball configured to be disposed within the housing and having a bore, wherein the ball is configured to rotate along a rotational path between an open position in which the bore is aligned with the first line and the second line and a closed position in which the bore is generally orthogonal to the first line and the second line;
 an annular seat disposed between the housing and the ball, wherein the annular seat comprises:
  one or more first surfaces, wherein a valve cavity pressure within a valve cavity exerts a first force on the one or more first surfaces that drives the annular seat away from the ball; and
  one or more second surfaces, wherein a first line pressure within the first line exerts a second force on the one or more second surface that drives the annular seat toward the ball;
 wherein a first surface area of the one or more first surfaces is at least 10 percent greater than a second surface area of the one or more second surfaces, and wherein the annular seat is configured to contact the ball when the ball is in the closed position, to automatically move away from the ball to provide a gap separating the annular seat and the ball as the ball rotates through a first portion of the rotational path, and to automatically move toward the ball as the ball rotates through a second portion of the rotational path such that the annular seat contacts the ball as the ball reaches the open position; and
 an annular cartridge disposed between the annular seat and the housing, wherein the annular cartridge supports an inner sealing ring disposed against the annular seat and an outer sealing ring disposed against the housing.

15. The ball valve of claim 14, wherein the ball valve comprises an annular space between the annular seat and the housing, the annular seat comprises a plurality of seals configured to isolate the annular space from the first line and from the valve cavity and an axially-extending passageway extending through the annular seat to enable fluid flow from the valve cavity to the annular space, and the plurality of seals comprises the inner and outer sealing rings of the annular cartridge.

16. The ball valve of claim 14, wherein the annular seat comprises a first annular sealing ring extending circumferentially about a radially-outer surface of the annular seat and an axially-extending passageway extending through the annular seat to enable fluid flow from the valve cavity to an annular space between the annular seat and the housing.

17. The ball valve of claim 16, wherein the annular cartridge extends circumferentially about the radially-outer surface of the annular seat, wherein the annular cartridge having the inner and outer sealing rings is configured to block a flow of working fluid from the first line to the annular space between the annular seat and the housing.

18. The ball valve of claim 17, wherein the axially-extending passageway is positioned between the first annular sealing ring and the annular cartridge along a radial axis of the ball valve.

19. The ball valve of claim 14, comprising a biasing member configured to bias the annular seat toward the ball.

20. The ball valve of claim 14, wherein the annular seat is configured to automatically move away from and toward the ball without use of external fluid sources, electronic controllers, motors, and actuators.

* * * * *